(No Model.) 3 Sheets—Sheet 1.
J. McMYLER.
TRUCK FOR SUPPORTING HEAVY MACHINERY.
No. 531,958. Patented Jan. 1, 1895.
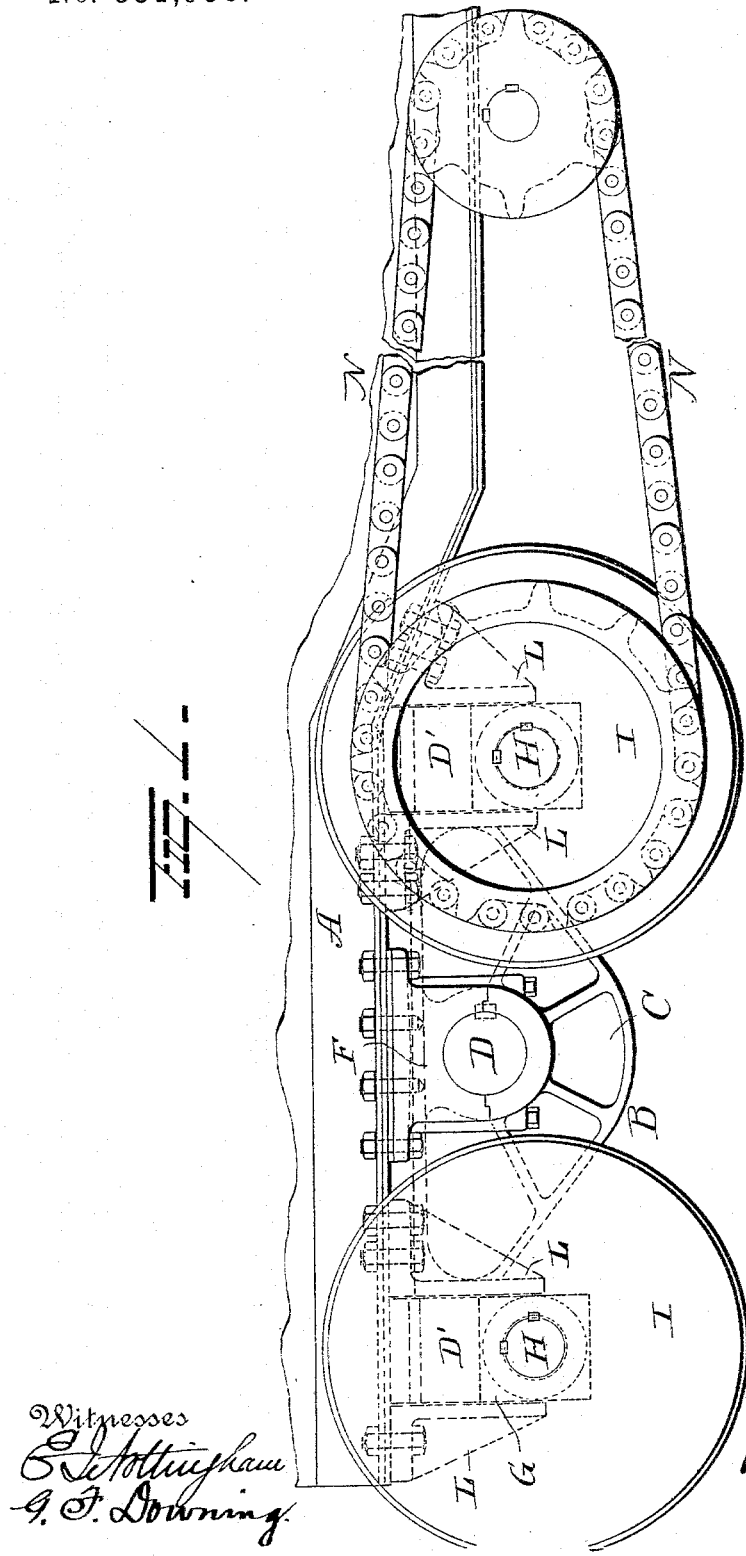
Witnesses
C. Nottingham
G. F. Downing
Inventor
J. McMyler
By K. A. Seymour
Attorney.

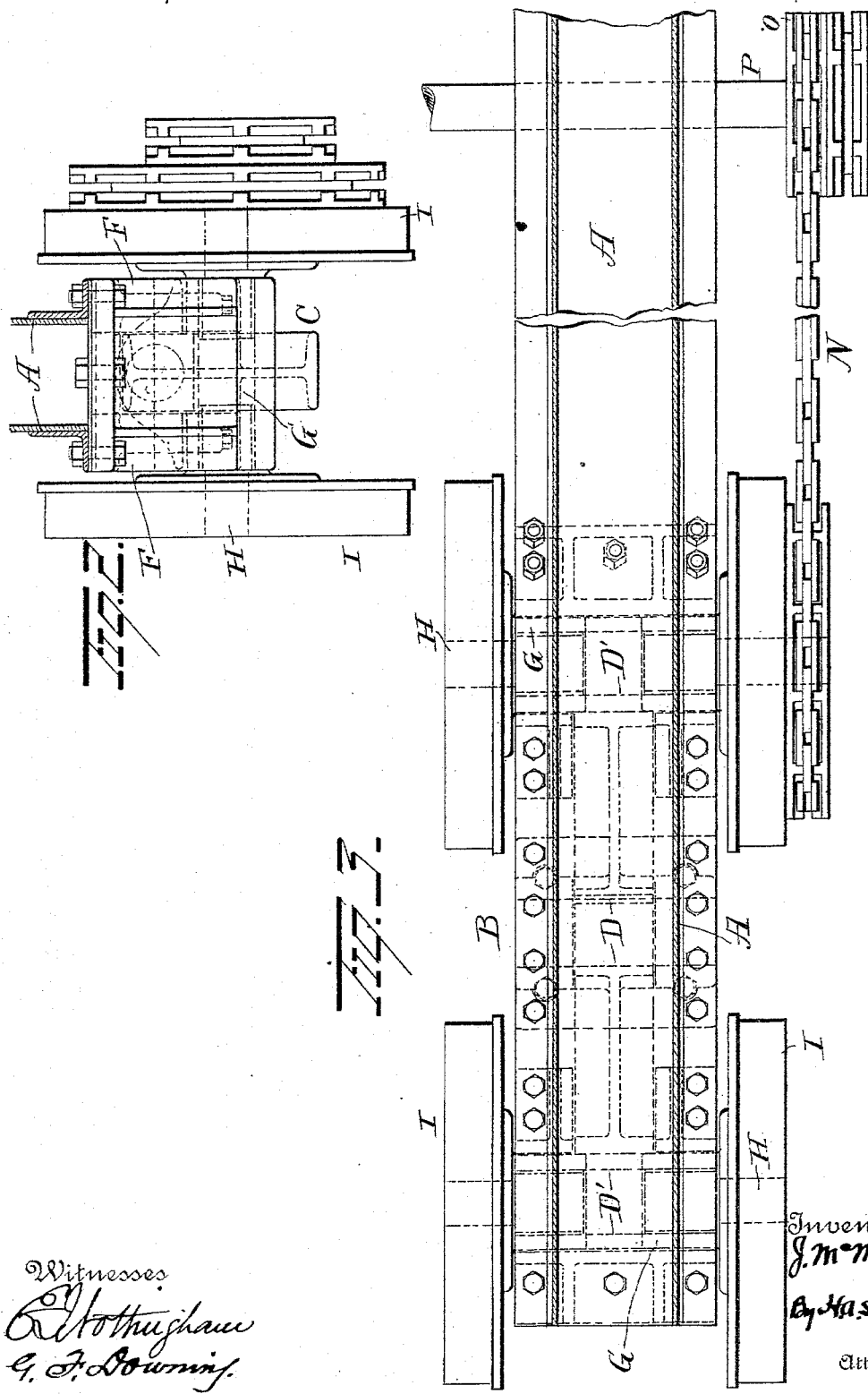

(No Model.) 3 Sheets—Sheet 3.

J. McMYLER.
TRUCK FOR SUPPORTING HEAVY MACHINERY.

No. 531,958. Patented Jan. 1, 1895.

Witnesses
E. J. Nottingham
G. F. Downing

Inventor
J. McMyler
By H. A. Seymour
Attorney

THE NORRIS PETERS CO., PHOTO-LITHO., WASHINGTON, D. C.

UNITED STATES PATENT OFFICE.

JOHN McMYLER, OF CLEVELAND, OHIO, ASSIGNOR, BY MESNE ASSIGNMENTS, TO THE McMYLER CAR-DUMPING MACHINE COMPANY, OF SAME PLACE.

TRUCK FOR SUPPORTING HEAVY MACHINERY.

SPECIFICATION forming part of Letters Patent No. 531,958, dated January 1, 1895.

Application filed February 1, 1894. Serial No. 498,786. (No model.)

*To all whom it may concern:*

Be it known that I, JOHN McMYLER, of Cleveland, in the county of Cuyahoga and State of Ohio, have invented certain new and useful Improvements in Trucks for Supporting Heavy Machinery; and I do hereby declare the following to be a full, clear, and exact description of the invention, such as will enable others skilled in the art to which it appertains to make and use the same.

My invention relates to an improvement in trucks for supporting heavy machinery such as portable cranes, excavators, car unloading devices, &c., the object of same being to so construct the parts that each truck is independent of the other, and the wheels of each truck adapted to follow irregularities or depressions in the track without affecting the others or straining the trucks or the parts carried thereby.

My invention consists in the parts and combination of parts as will be more fully described and pointed out in the claims.

Figure 4:
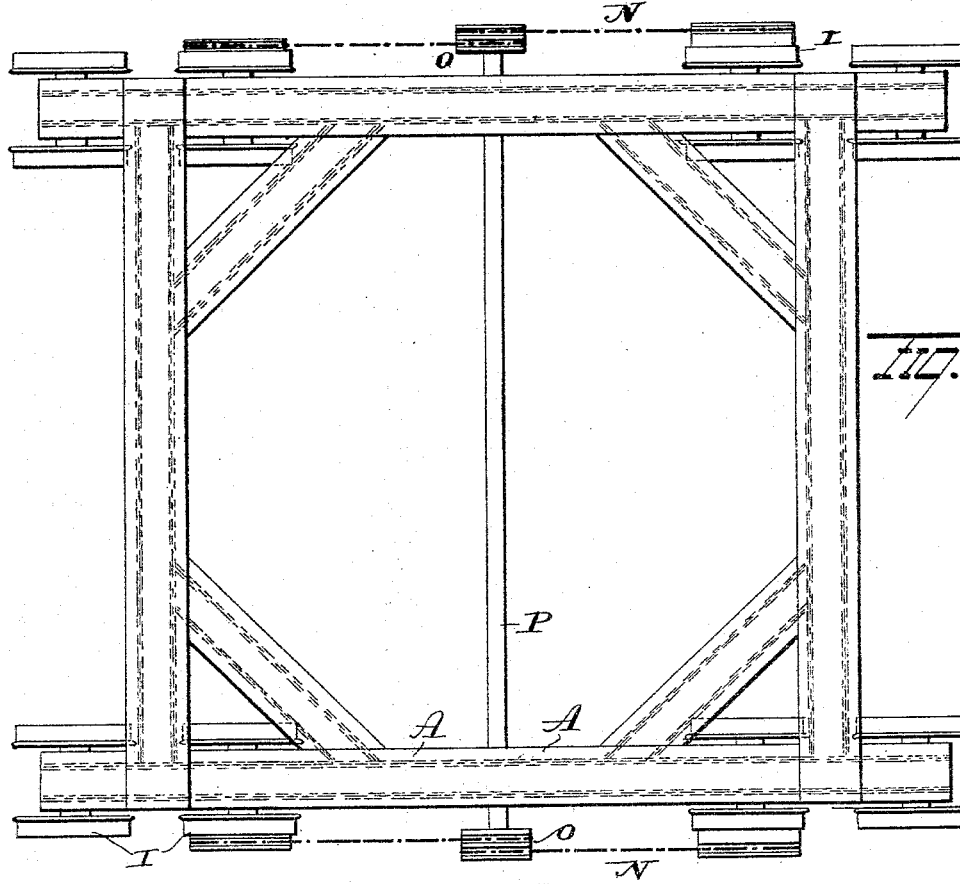
Figure 5:
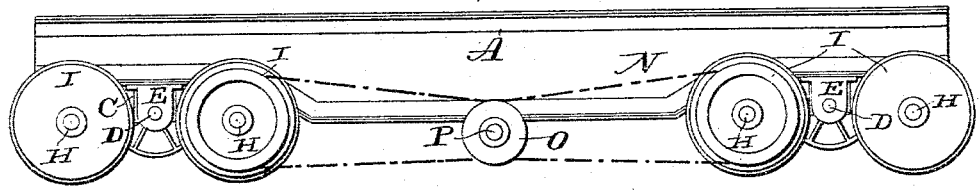
Figure 6:
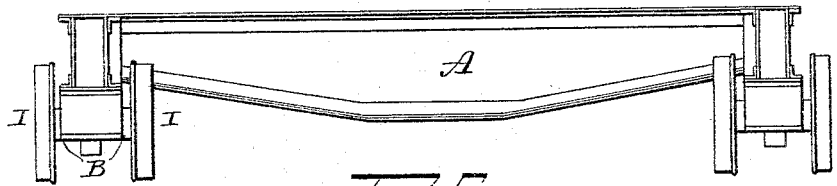

In the accompanying drawings, Figure 1 is a view in side elevation of a sectional portion of a truck embodying my invention. Fig. 2 is an end view; Fig. 3, a plan view of same. Fig. 4 is a plan view. Fig. 5 is a view in side elevation, and Fig. 6 an end view of the truck.

A represents a section of one side of the frame of a machine such for instance as an excavator, crane or other portable machine supported at its ends and at intermediate points if desired by trucks B. Each truck consists of a beam C having centrally located trunnions D which latter are mounted in bearings F, depending from the under side of frame A. This beam is capable of a limited rocking motion similar to the motion of a walking beam, and is provided at its two ends with trunnions D' located at right angles to the trunnions D. Mounted on the trunnions D' are the bearings G each of which carries an axle H to the ends of which are secured the flanged track wheels I.

From the foregoing it will be seen that the beam C has a rocking movement in the direction of its length while the bearings G carrying axles H each have a rocking movement in the direction of the length of the axles H or at right angles to the length of the beam.

The four wheels constituting a single truck run on two parallel tracks, parallel tracks also being provided for the trucks on the opposite side of frame A.

To prevent lateral straining of the bearings G and trunnions D' I have provided the guide plates L secured to the under side of frame A and located on opposite sides of the bearings G carrying the axles H. These plates L permit of the vertical movement of the bearings G caused by the rocking of beam C on its trunnions D, and also permit of the rocking motion of the bearings G on the trunnions D'. Usually four of these trucks are sufficient to support the frame A, the two trucks on each side moving on parallel tracks. If desired however more than two trucks can be located at each side and if desired can be located under the center of frame.

In any event it will be seen that as the trucks are pivotally mounted on centrally located horizontal trunnions and the bearings carrying the axles on trunnions at right angles to the beam supporting trunnions, the parts are free to vibrate to allow the wheels to ride over depressions or elevations without straining the trucks or frame and without taking any strain from or throwing additional strain on other wheels supporting the frame.

One of the wheels preferably at each end of the frame and on both sides if desired is provided with a sprocket wheel around which passes the drive chain N. This chain receives motion from the sprocket wheel O on drive shaft P, and operates to propel the machine on the track. If desired other propelling means may be substituted for the chain and sprockets.

It is evident that numerous slight changes and alterations might be resorted to without departing from the spirit and scope of my invention and hence I would have it understood that I do not confine myself to details of construction, but consider myself at liberty to make such changes and alterations as fairly fall within the spirit and scope of my invention.

Having fully described my invention, what I claim as new, and desire to secure by Letters Patent, is—

1. The combination with a frame and bearings thereon of a beam having side trunnions the latter mounted in said bearings, bearings pivotally mounted on the ends of said beam and adapted to have a rocking motion thereon and wheels carried by said bearings, substantially as set forth.

2. The combination with a frame and bearings thereon, of a beam pivotally supported at its center in said bearings and provided with end trunnions, a bearing pivotally mounted on each end trunnion, an axle carried by each bearing and two wheels secured to each axle, substantially as set forth.

3. The combination with a frame and bearings thereon, of a beam pivotally supported at its center in said bearings and provided with end trunnions, a bearing pivotally mounted on each end trunnion, an axle carried by each bearing, guides for said bearings an axle carried by each bearing and two wheels on each axle, substantially as set forth.

4. The combination with a frame and bearings thereon of a beam pivotally supported at its center in said bearings and provided with end trunnions, a bearing pivotally mounted on each end trunnion an axle carried by each bearing two wheels on each axle and means for rotating one of the wheels, substantially as set forth.

In testimony whereof I have signed this specification in the presence of two subscribing witnesses.

JOHN McMYLER.

Witnesses:
WILLIAM P. MURRAY,
ALTON C. DUSTIN.